July 13, 1948. F. B. HALFORD 2,445,114
ARRANGEMENT OF JET PROPULSION ENGINE ELEMENTS
Filed July 20, 1943 9 Sheets-Sheet 3

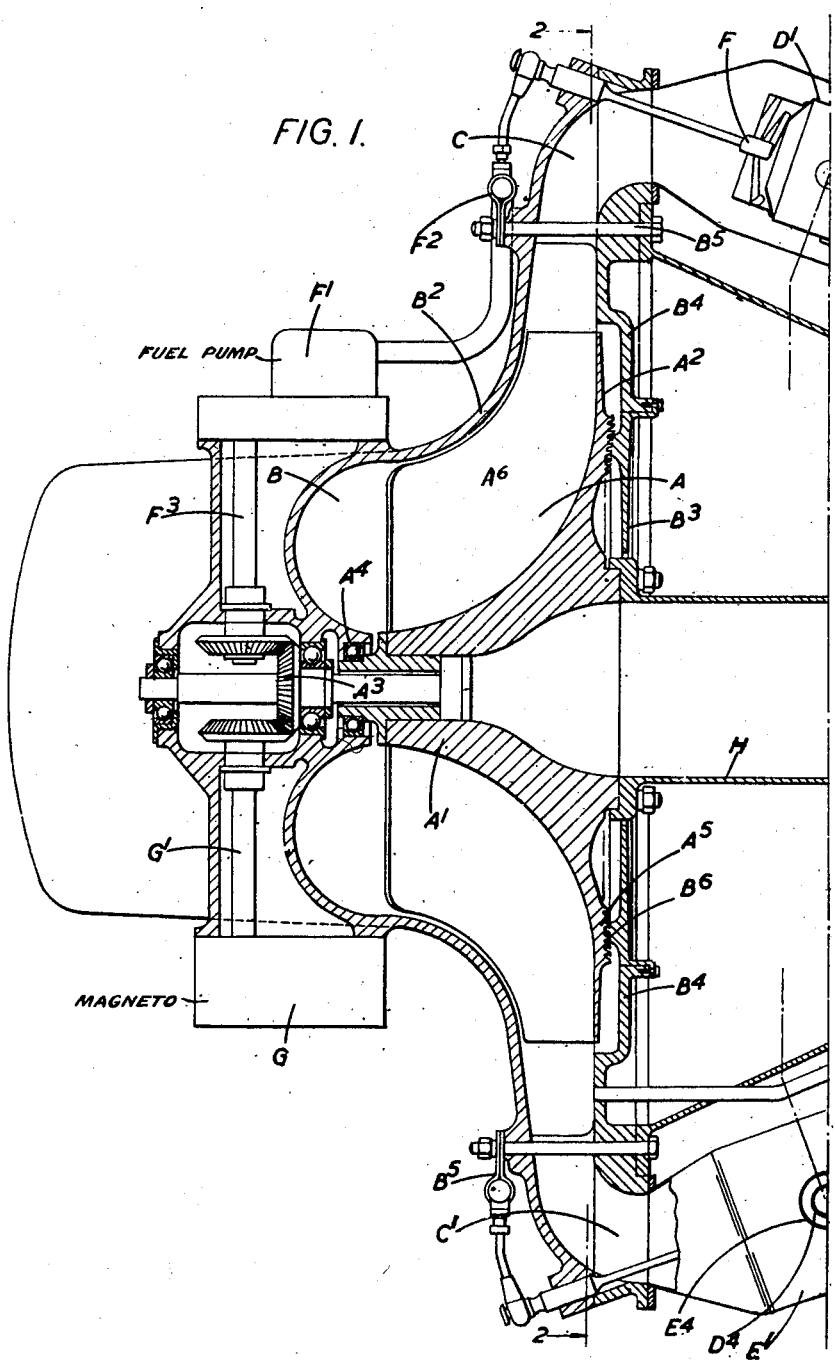

Inventor
Frank Bernard Halford
By Loyd Hall Sutton
Attorney

Inventor
Frank Bernard Halford
By Loyd Hall Sutton
Attorney

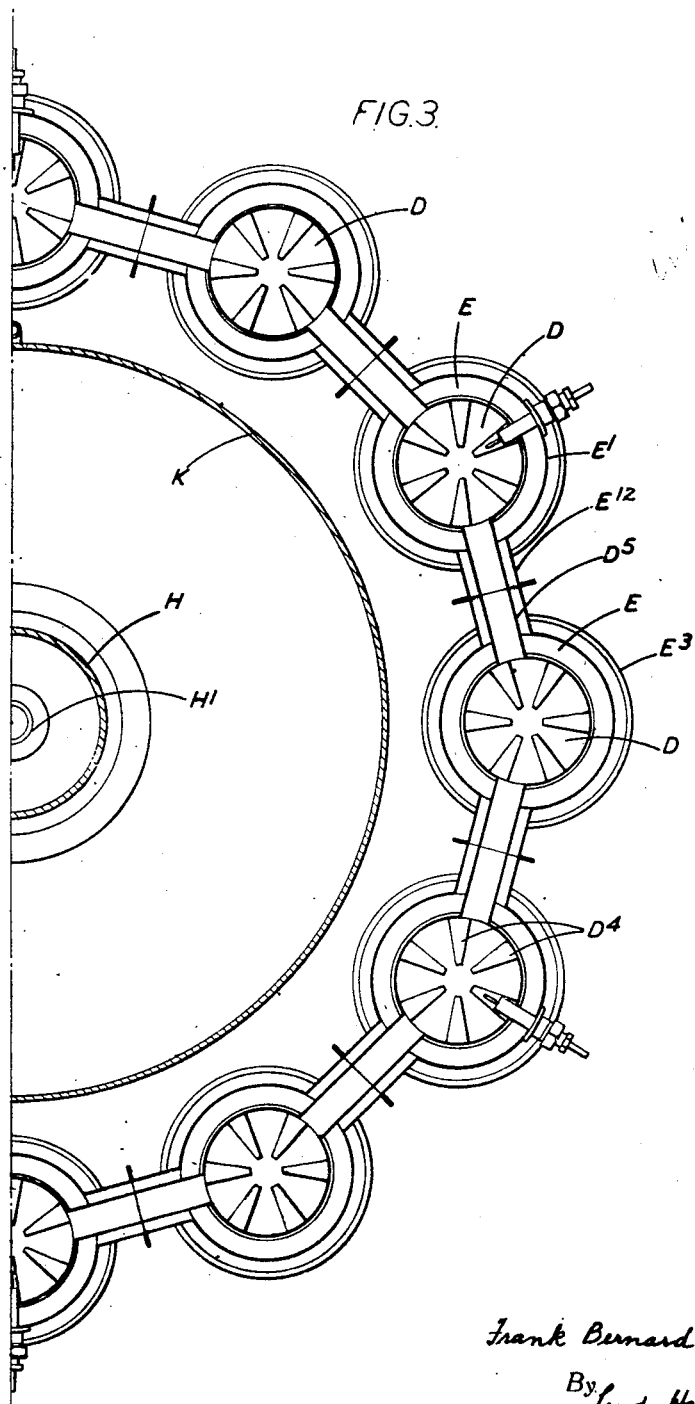

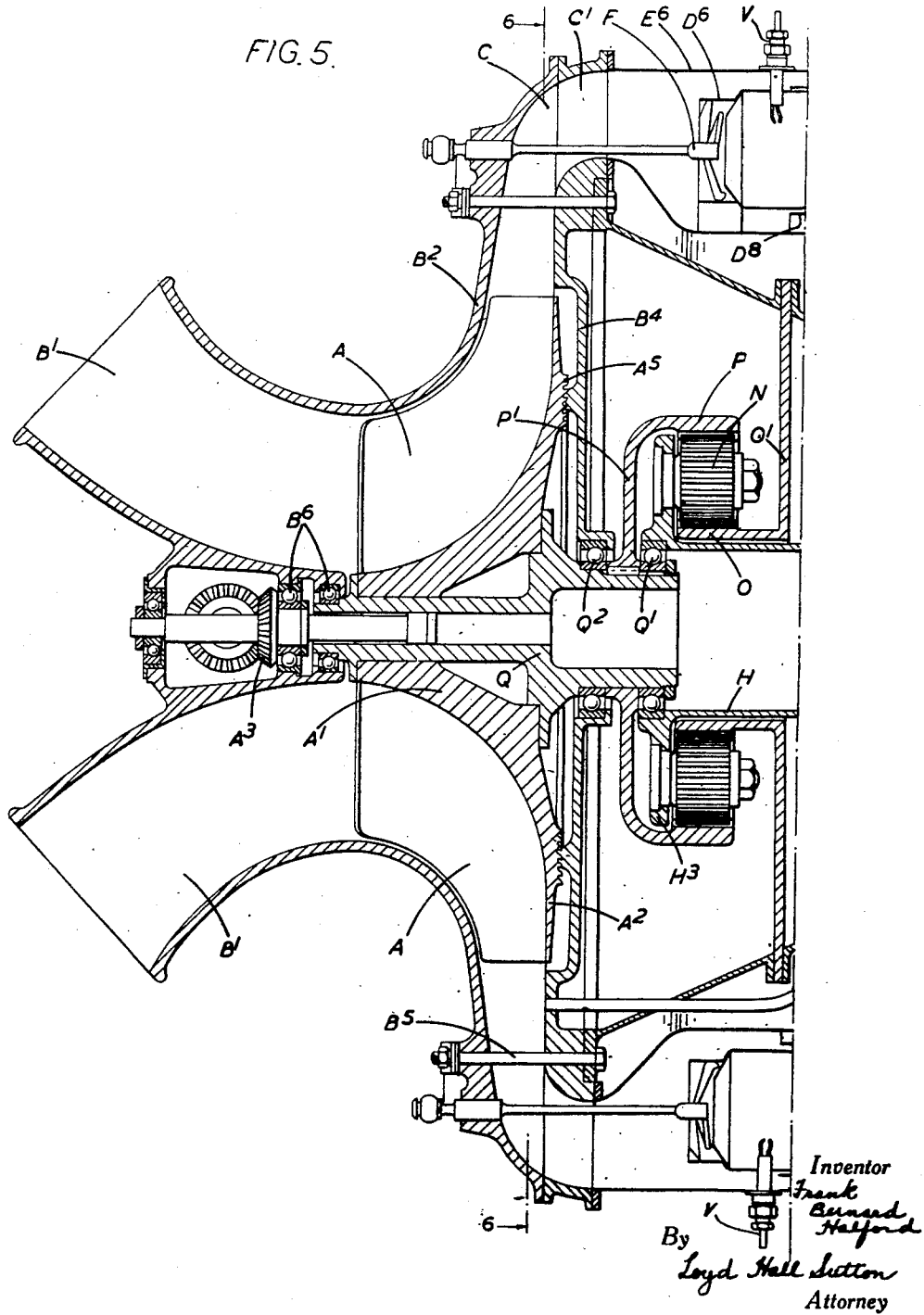

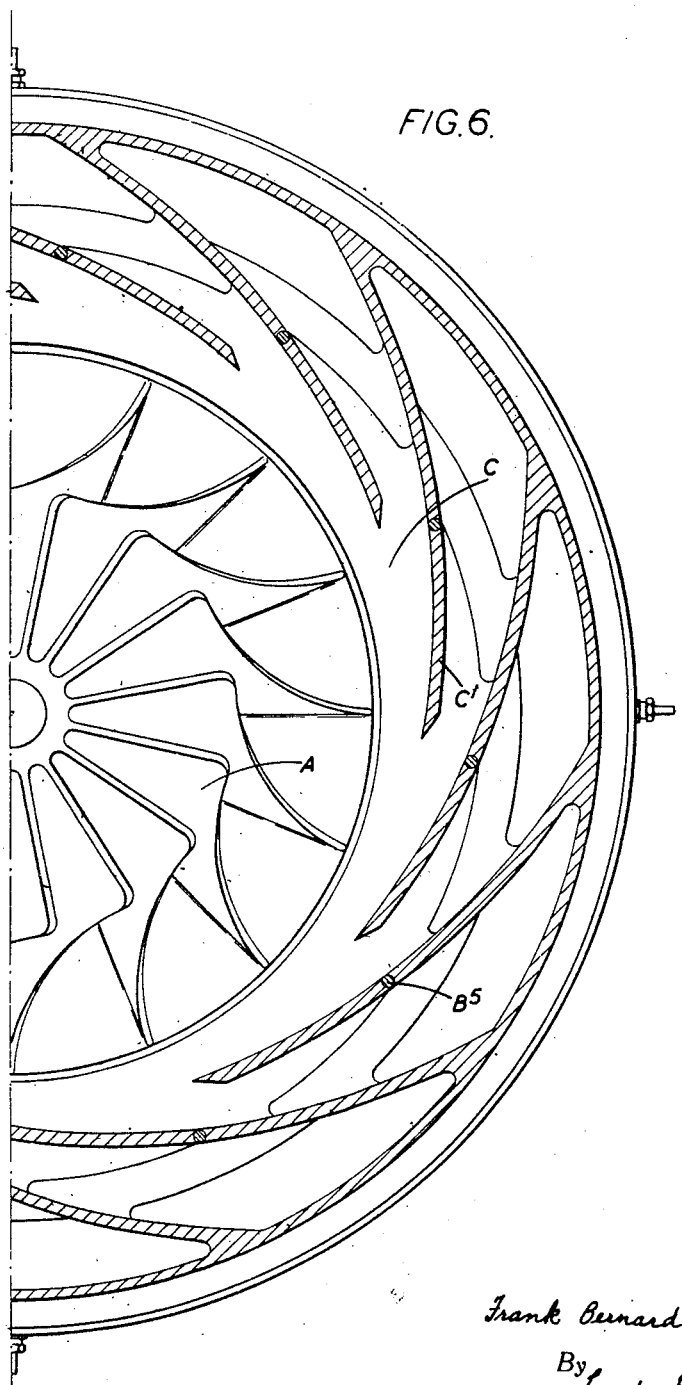

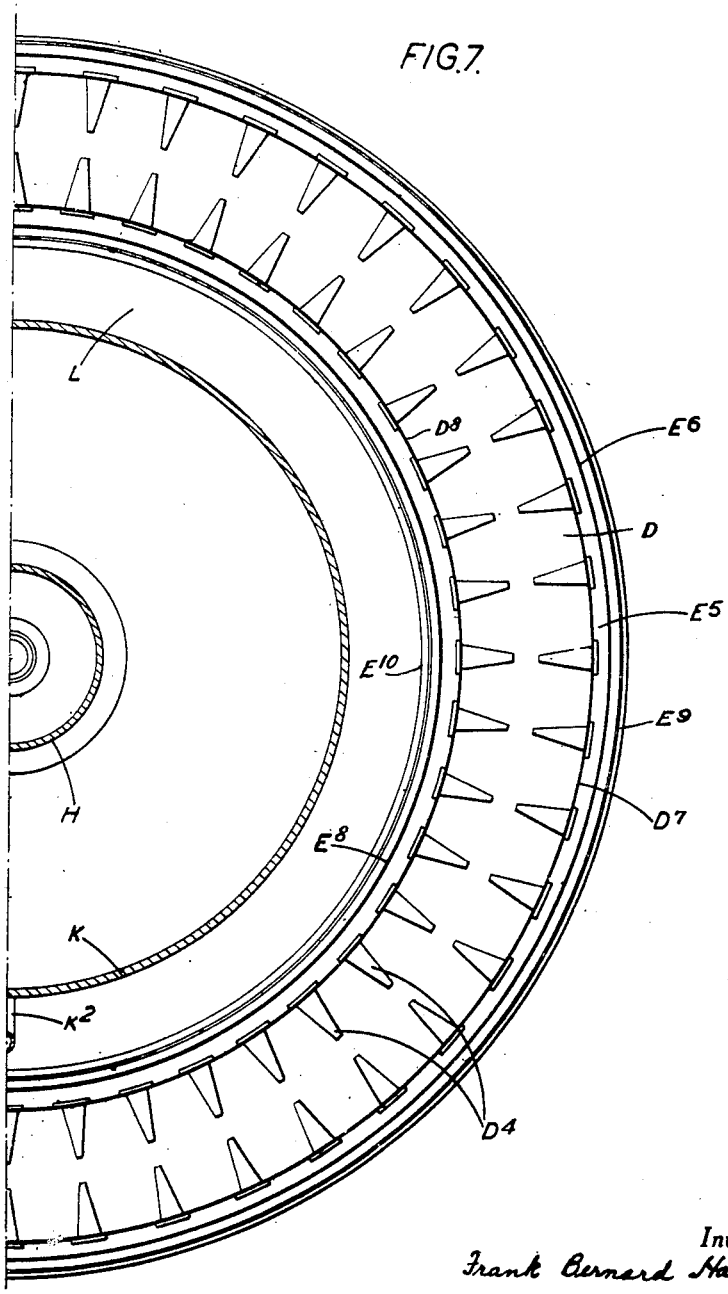

Patented July 13, 1948

2,445,114

UNITED STATES PATENT OFFICE 2,445,114

ARRANGEMENT OF JET PROPULSION ENGINE ELEMENTS

Frank Bernard Halford, Edgware, England, assignor to The De Havilland Aircraft Company Limited, Edgware, England, a company of Great Britain Application July 20, 1943, Serial No. 495,517
In Great Britain November 21, 1941

13 Claims. (Cl. 60—35.6)

This invention relates to apparatus for the propulsion of aircraft though it may be adapted for use on seacraft or on land vehicles. The invention has for its object to effect certain improvements in apparatus of a known type wherein air is delivered by a compressor into a combustion chamber where fuel is burnt in the air and the resultant hot gases first act on a turbine which drives the compressor and then issue into the atmosphere in the form of one or more jets which have a propulsive effect.

It is an object of this invention to provide improved apparatus of the character described wherein air drawn into the compressor by a single-sided impeller is delivered radially with respect to the impeller and passes directly into one end of a combustion chamber wherein fuel is burnt, the hot gases flowing straight through the combustion chamber in the axial direction and then passing over the blades of a turbine which is coaxial with and drives the compressor, the gases from the turbine flowing through a passage to a single rearward-facing outlet orifice.

Another object of the invention is to provide apparatus of the character described which is designed so that so far as practicable the air is given unidirectional flow through the whole apparatus the only material change in direction of flow taking place in the compressor, where the change is from the axial to the radial direction, and then when it leaves the compressor and enters the combustion chamber, where the change is back to the general axial direction and wherein the change in direction takes place smoothly, first as a result of the formation of the impeller of the compressor, and secondly owing to the formation of the annular part wherein the radial delivery from the impeller is deflected in the general axial direction into the end of the combustion chamber, whether this is a single annular chamber or is constituted by a series of separate units.

Another object of this invention is to provide apparatus of the character described having improved connections between the compressor and turbine.

The accompanying drawings illustrate by way of example constructions which may be employed in carrying the invention into practice. In these drawings—

Figures 1, 1a and 1b show a longitudinal sectional elevation showing one construction of the apparatus.

Figure 3 is a half transverse section on the line 3—3 in Figures 1 and 1a looking in the direction of the arrows.

Figures 5 and 5a show a longitudinal sectional elevation similar to Figures 1, 1a and 1b but illustrate an alternative construction.

Figure 6 is a half transverse section on the line 6—6 in Figure 5 looking in the direction of the arrows, but showing the impeller in end view as in Figure 2.

Figure 7 is a similar half section on the line 7—7 in Figure 5a looking in the direction of the arrows.

Figure 1A:
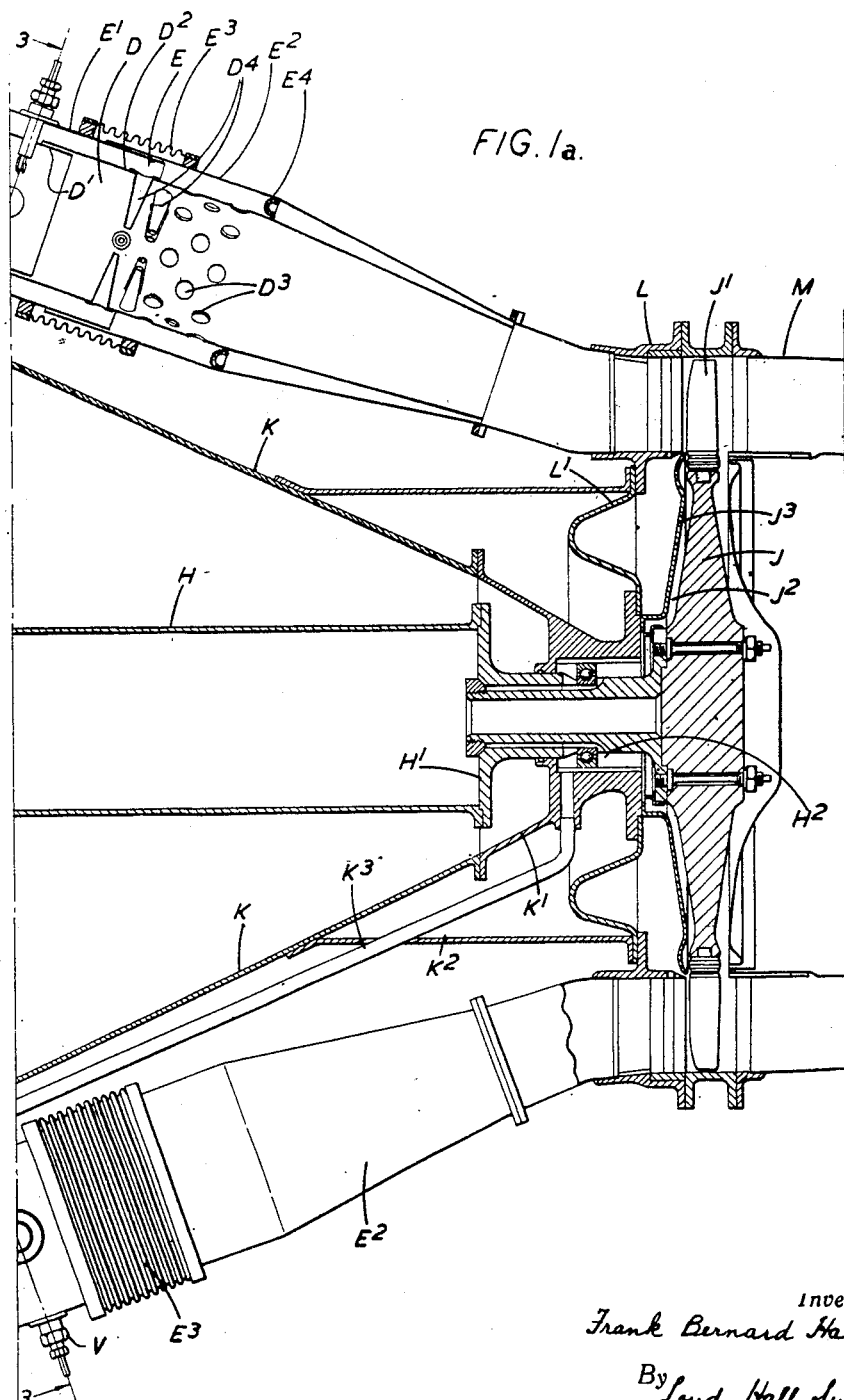
Figure 4:
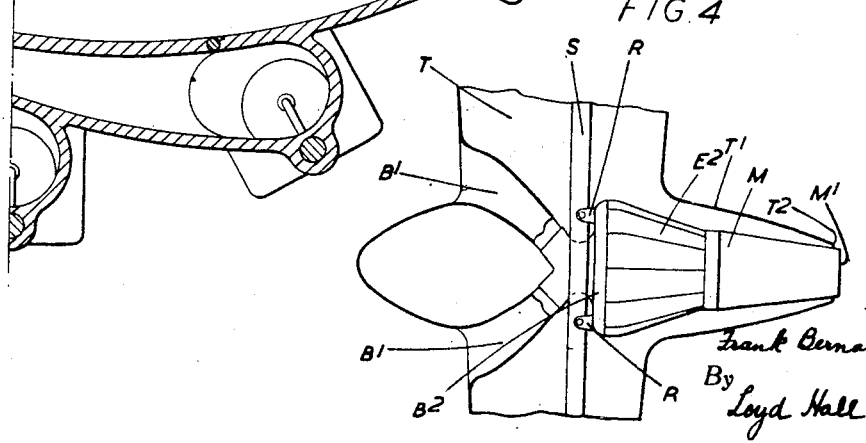
Figure 4 is a diagrammatic sectional plan on a smaller scale showing how the propulsion apparatus may be mounted in the wing of an aircraft.
Figure 5A:
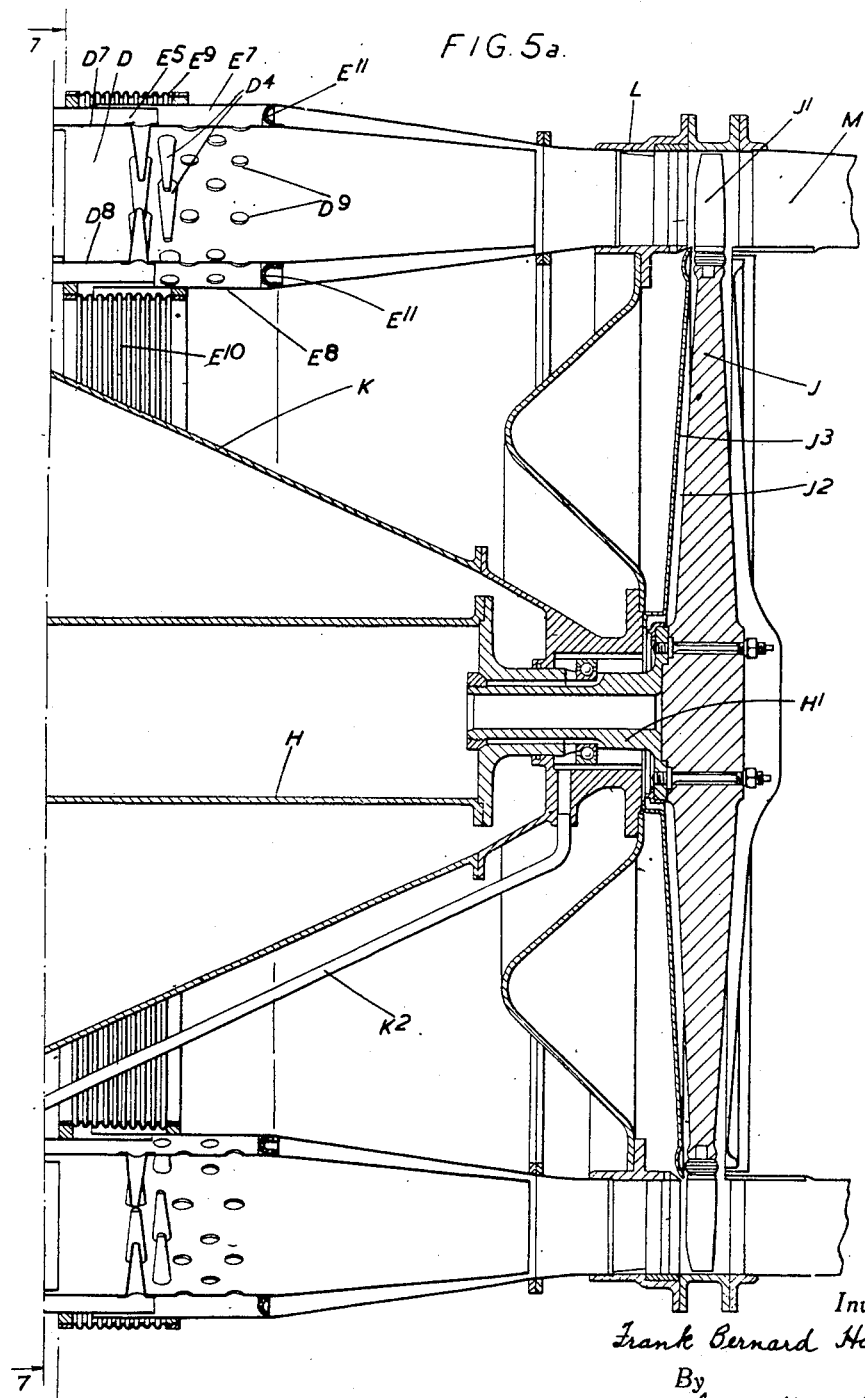

Referring to Figures 1, 1a, 1b, 2 and 3, these show a construction having a general conical formation and a series of separate, but intercommunicating compartments which collectively are herein referred to generically as the combustion chamber. The impeller A is of the single-sided type and thus has a single entry B, here shown as annular, into which in this case lead two intake passages $B^1$ such as shown in Figure 4 and Figure 5. The general structure of the impeller is to be seen from Figures 1 and 2, but in detail it will be found described in the specification of the present applicant's U. S. Patent No. 2,422,615, dated June 17, 1947. The blades $A^6$ are integral with the hub $A^1$ and the disc-like back $A^2$, and as it is rotated the impeller delivers the air radially into an annular chamber C wherein the air stream is deflected into the axial direction being guided at the same time by the vanes $C^1$ into the ends of a series of separate combustion compartments or chambers D, some part of the air, however, being allowed to flow through a jacket E which surrounds and is arranged to cool the wall of each chamber. In the entry to each combustion chamber is mounted a nozzle F through which a jet of fuel is delivered into the chamber, ignition of the fuel being ensured by a sparking plug V placed in the chamber near the jet as seen in Figure 1a. The delivery of the fuel is effected by a pump $F^1$ through a pipe $F^2$ from which branches lead to each nozzle F. This pump is driven through a radially mounted shaft $F^3$ carrying a bevel wheel which meshes with a bevel wheel $A^3$ on an extension from the hub $A^1$ of the impeller. In a similar way a magneto G may be driven through a radial shaft $G^1$ to supply current to the sparking plugs, though other means may be employed for supplying current to these plugs.

The hub $A^1$ of the impeller is bolted to a flange on one end of a tubular shaft H which at its other end is connected to the turbine rotor J through an intermediate shaft part $H^1$ of less diameter than the main part H. This tubular shaft has a substantial diameter which is greater than the bearings at each end in which it rotates. The one of these bearings $A^4$ is disposed on the extension on the hub of the impeller and on the forward side of the latter and behind the bevel wheel $A^3$. The other bearing is at $H^2$ and surrounds the shaft part $H^1$ adjacent to the turbine rotor J. This arrangement provides a substantial connection between the impeller of the compressor and the rotor of the turbine with the bearings for these parts well spaced apart.

Figure 2:
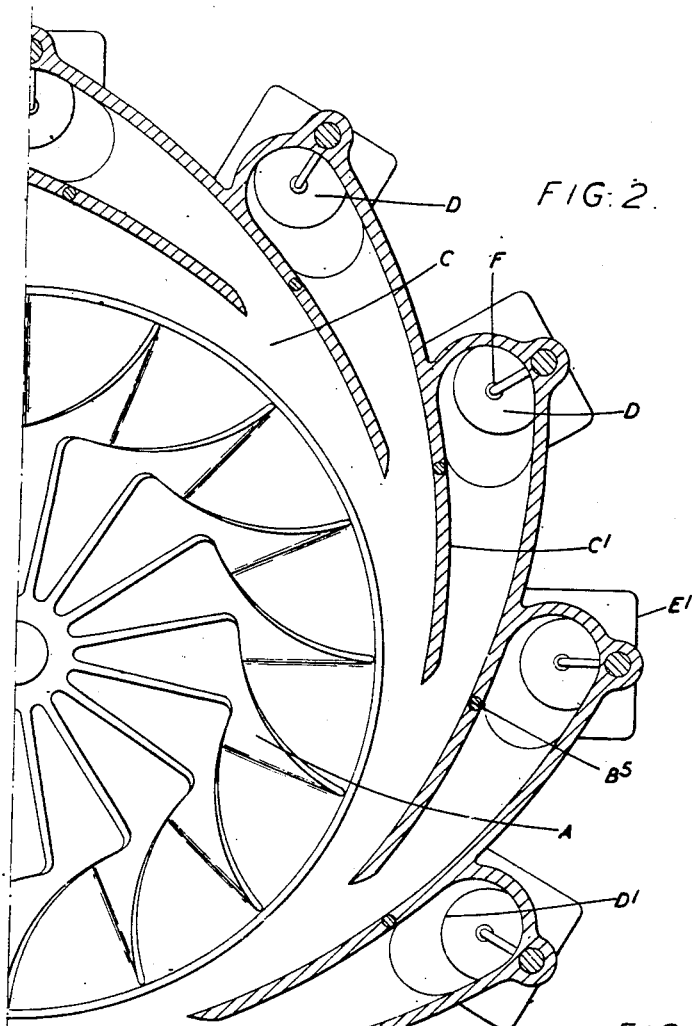
Figure 2 is a half transverse section on the line 2—2 in Figure 1, looking in the direction of the arrows, but showing the impeller in end view.

The intake passages to the impeller are formed in a fixed casing $B^2$ which encloses the front of the compressor and has in it a part of the chamber C. At its back the impeller is closed in by a plate $B^3$ detachably connected about its periphery to an annular member $B^4$ which in turn is connected by bolts $B^5$ to the main part $B^2$ of the casing of the compressor. In this member $B^4$ are vanes $C^1$ which divide the chamber C into a series of passages each of which leads into the end of a combustion compartment as seen in Figure 2. Between the plate $B^3$ and the disc $A^2$ which forms the back of the impeller is arranged a labyrinth packing comprising a series of annular ribs $A^5$ alternating with grooves formed on the face of the impeller back plate with which engage a series of similar alternating annular grooves and ribs $B^6$ formed on the face of the plate $B^3$. Since the plate $B^3$ is separate from the annular member $B^4$ it is possible to interchange such plates which may have rather different arrangements of the packing ribs and grooves thus enabling an adjustment to be made which permits a satisfactory sealing to be ensured and leakage prevented from the back of the compressor.

Figure 1B:
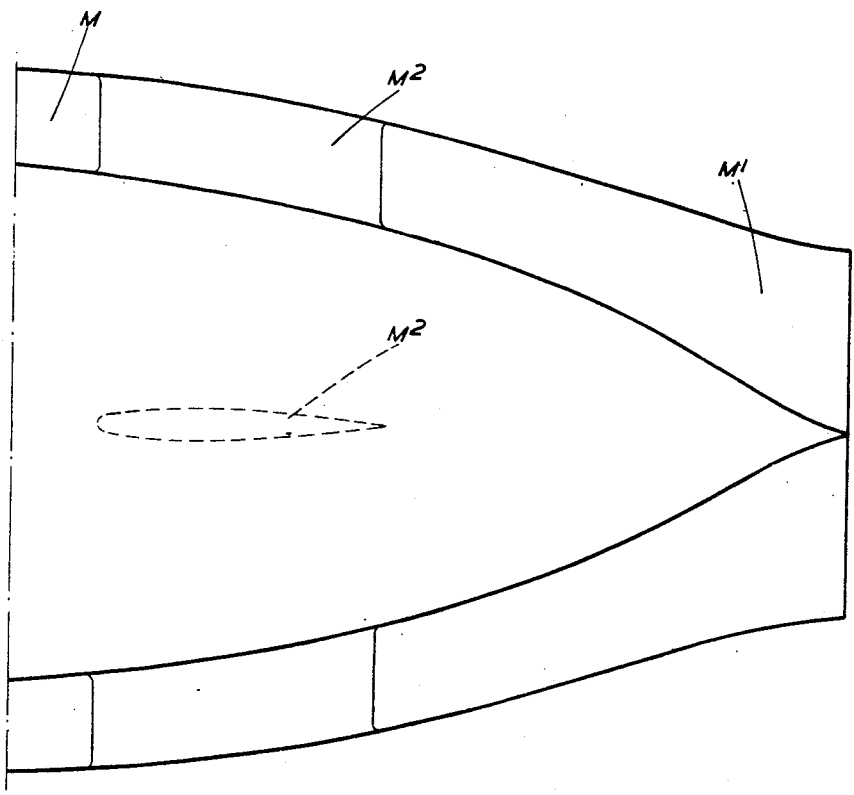

The bolts $B^5$ which serve for the attachment of the back plate $B^3$ to the main part of the casing are used also for fixing the larger end of a conical casing member K which encloses the tubular shaft H and extends from the compressor casing $B^2$, $B^4$ to a part $K^1$ which surrounds the bearing $H^2$ and carries the outer race of this bearing. The rear ends of the several combustion chambers D open into and are carried by an annular member L in which are guide vanes directing the gas streams on to the blades $J^1$ of the turbine J. This member L is connected to the part $K^1$ through a plate $L^1$ in which is an annular corrugation. The member L and through it the rear end of the combustion chamber is also conveniently connected to the conical member K by a cylindrical member $K^2$. This general arrangement, particularly including the conical member K and the cylindrical member $K^2$, constitutes a rigid connection between the compressor casing and the shaft bearing $H^2$ near the turbine rotor and provides suitable support for the rear ends of the combustion chambers D. Air for cooling the bearing $H^2$ is led through a pipe $K^3$, conveniently carried outside the conical casing K, from within the impeller casing to the part $K^1$ in which is this bearing. This air going past and over the bearing is caused to flow radially through a space $J^2$ between the forward face of the turbine rotor J and a fixed disc $J^3$. At the periphery of the rotor the air is caused to flow between the blade roots in the axial direction and it then passes into the annular passageway M through which flow the gases which have passed over the blades of the turbine on their way to the single outlet or nozzle $M^1$. As can be seen in Figure 1b the inner and outer walls of the annular passageway M are connected by radially arranged spacing members $M^2$ conveniently of streamline section.

Each chamber or compartment may comprise the following features. The chamber in which combustion takes place is cylindrical for a good part of its length being wholly surrounded by the air jacket E. To allow for expansion a construction which may be used is shown in the drawing the chamber being formed in two parts $D^1$, $D^2$ which are coaxial and the end of one part can slide telescopically in the end of the other part as seen in Figure 1a. The casing of the air jacket E is also formed in two parts of which one part $E^1$ is connected to the back plate member $B^4$ of the compressor casing. The end of this part slides telescopically in the end of the other part $E^2$ and these parts are connected by a circumferentially corrugated sleeve $E^3$ the ends of which are respectively attached to the two parts $E^1$ and $E^2$ of the casing. Within the part $E^2$ the casing is provided with a perforate spacing member $E^4$ which is attached to the wall of the part $D^2$ of the combustion chamber D which is thus carried by the casing part $E^2$. Such an arrangement permits of expansion of the combustion chamber and the air jacket casing in the longitudinal direction and allows a certain degree of flexibility. In the wall of the part $D^2$ of the combustion chamber are a series of holes $D^3$ through which air from the jacket space E can pass into the chamber and assist in the combustion of the fuel delivered from the jet nozzle F. In some cases and in order to carry this air from the jacket well into the body of gas passing through the combustion chamber a conical open-ended tube such as $D^4$ may be fitted in at least some of the holes $D^2$, these tubes projecting into the combustion chamber space. The air can issue from the inner ends of these conical tubes which if desired may have holes in their walls.

As can be seen from Figure 1 and also as shown in Figure 4 the jacketed combustion chambers are arranged in a generally conical formation around the conical casing member K and suitably spaced apart from it as seen in Figures 1 and 3. Tubular connecting passages may be provided as shown between adjacent chambers and their air jackets. Each connecting tube $D^5$ between two combustion chambers has around it and concentric with it a tube $E^{12}$ which forms a connection between the air jackets E and itself forms an air jacket around the tube $D^4$. These tubular connections are so constructed and arranged as to permit of ready assembly and dismantling.

The air passes from the several points of intake to the impeller of the compressor through the single entry without shock and it thus admits of full use being made of the relative air velocity at the points of intake which may have such number, form and disposition as may be convenient.

Turning now to Figures 5, 5a, 6 and 7, these show a construction in which a single annular chamber constitutes the combustion chamber. As a means of permitting expansion this chamber is formed in two parts the ends of which can slide telescopically one within the other. The first part D⁶ is relatively short in the axial direction and has in its forward part a series of jet nozzles F to which fuel is supplied from a pump driven through gearing from the wheel A³ on the shaft of the impeller A as described and shown in Figure 1. These jet nozzles are suitably spaced apart around the entry into the combustion chamber into which air is delivered from the impeller after passing through the chamber C being therein deflected by the vanes C¹. One or more sparking plugs V are also provided and mounted in the outer wall of the chamber. The other or main part of this chamber is enclosed between outer and inner concentric walls D⁷ and D⁸. The whole combustion chamber is enclosed in an air jacket E⁵ formed by an annular part E⁶, an outer casing E⁷ and an inner casing E⁸. Expansion is here allowed for by each of these annular casings being formed in two parts which can slide telescopically and these parts are connected by sleeves E⁹ and E¹⁰ which are circumferentially corrugated and at their ends are attached to the two parts of each casing. Ribs or the like E¹¹ forming a perforate partition disposed in the air jacket spaces E⁵ serve to connect the outer and inner casings E⁷ and E⁸ to the adjacent walls D⁷ and D⁸ of the combustion chamber which is thus carried by these casings. The casings E⁷ and E⁸ at their after ends are carried by an annular member L which is arranged as shown and as described in reference to Figure 1. All the gases from the combustion chambers together with the air passing through the air jacket E⁵ flow past guide vanes mounted in this member L on to the blades J¹ of the turbine J and thence into the annular passageway M and so to the single outlet therefrom. Holes D⁹ in the walls D⁷ and D⁸ of the main part of the combustion chamber allow air to pass from the jacket space E⁵ into the chamber.

In this construction a change speed gear is shown as interposed in the drive from the turbine J to the impeller A. On the forward end of the tubular shaft H through which this drive is transmitted is a flange which carries the pinions N of an epicyclic gear. These pinions mesh with a sun wheel O carried on an annular plate O¹ which is held at its periphery by the conical casing member K which in this instance is formed in two parts to permit of this mounting of the plate O¹. The pinions N also mesh with the toothed annulus P carried by a member P¹ which is mounted on and can rotate with a shaft member Q on which is fixed the hub A¹ of the impeller. Bearings Q¹ and Q² are arranged between the end portion of this shaft member and the forward end of the tubular shaft H and the back plate B⁴ of the compressor casing which in this case closes in the whole of the back of the impeller disc A² and has the annular ribs and grooves of the labyrinth packing. At its forward part this shaft member Q rotates in bearings B⁶ in the main fixed part B² of the compressor casing and this shaft carries the bevel wheel A³ through which are driven the auxiliaries. In this way the compressor will be driven by the turbine at an increased speed. If desirable a similar change speed gear may be provided and similarly arranged in the construction shown in Figure 1.

In Figure 4 is shown diagrammatically how the improved propulsive apparatus may be mounted in an aircraft. The compressor casing B² is provided with lugs R by means of which the apparatus is bolted to a wing spar S. The two air intakes B¹ are arranged in the leading edge of the wing T and a hollow projection T¹ extending from the rear edge of the wing encloses the after part of the apparatus and provides support at T² for the end of the annular passageway M adjacent to the outlet M¹.

Whether the combustion chamber is a single annular chamber or is divided into separate compartments, and has a generally cylindrical or a conical formation, the casing between the compressor and the turbine is preferably conical. By means of this casing and more especially if it is conical, there is given such rigidity to the apparatus as a whole that if the compressor casing is attached by bolts to the machine which is propelled by the apparatus, the whole of the rear part up to the gas outlet orifice may be unattached except for yielding supports which are preferably though not necessarily provided and disposed towards the rear end. A general conical formation for the whole apparatus contributes to this rigidity. The arrangement permits the bearings for the rotor of the compressor and the rotor of the turbine to be widely spaced apart and substantial coupling connections to be employed between these rotors whereby the mass balancing of the complete rotating assembly is facilitated.

The construction of the turbine rotor may vary, but as mentioned and shown in the drawings the turbine is preferably of the axial flow type with fixed blades which lie at the rear end of the combustion chamber through which the hot gases flow to impinge on the blades of the rotor. As described above air, conveniently bled from the compressor, is led to the turbine rotor and over or through its peripheral part adjacent to the blades for the purpose of cooling the roots of the latter and the rotor.

What I claim as my invention and desire to secure by Letters Patent is:

1. In jet propulsion apparatus of the type including a compressor having a single-sided impeller which delivers air radially with respect to the impeller into an annular chamber, a combustion chamber constituted by a series of elongated separate compartments which are similar and disposed side by side about the axis of the apparatus, said compartments all extending from the said annular chamber in the direction of the axis and the air from the compressor passing directly into all said compartments, means whereby fuel is burnt in each of the said compartments, the fuel being introduced at the end of each compartment where the air enters from the compressor, a turbine coaxial with but spaced apart from the said impeller, the gases from all the said combustion chamber compartments flowing directly to and acting on the blades of said turbine, a connection between the turbine and the impeller through which the impeller is driven by the turbine, and an annular passage terminating in a single outlet orifice through which flow the gases after they have acted on the turbine, the combination of an air jacket enclosing all the compartments of said combustion chamber and through which flows some part of the air delivered by said compressor, a lateral communicating passage between each two adjacent compartments, and an air jacket for each lateral passage in communication with said first named air jacket.

2. A fluid jet propulsion apparatus having a nozzle discharging to the rear thereof comprising a generally conical casing, disposed with its larger diameter towards the forward end of said apparatus, a shaft journalled within said casing and extending lengthwise of its principal axis, an impeller of the single side radial flow type fixed on said shaft adjacent to the larger diameter of said casing with its entry towards the front, walls forming a compression chamber in the casing around said impeller, a plurality of tubular combustion means disposed circumferentially around said casing and having their axes converging rearwardly, the intake ends of said tubular combustion means each communicating with said compression chamber, a turbine wheel fixed on said shaft adjacent to the smaller end of said casing and enclosed by an extension thereof, and conduit means forming communication between the discharge ends of said tubular combustion means and said casing extension adjacent to the periphery of the turbine wheel, said impeller, compression chamber, tubular combustion means, conduit means and turbine wheel being disposed in sequence providing a continuously rearward path for air and products of combustion through said apparatus.

3. In apparatus of the type set forth in claim 2, individual air jackets around each tubular combustion means, and guide means forward of the juncture of the compression chamber and the air jackets for directing air both through the tubular combustion means and air jackets.

4. In apparatus as described in claim 3, converging individual conduit means from the tubular combustion means and air jackets to the turbine wheel.

5. Apparatus of the type set forth in claim 2, wherein the shaft is hollow and has a main body of enlarged diameter and reduced end sections, the latter being provided with bearings adjacent said impeller and turbine wheel respectively.

6. Apparatus of the type set forth in claim 2, wherein the tubular combustion means are substantially cylindrical and are disposed with their axes in coaxial radial planes and parallel to the adjacent elements of the outer surface of said casing.

7. Apparatus of the type set forth in claim 2, having transversely disposed conduit means connecting adjacent tubular combustion means and providing fluid pressure equalizing ducts therebetween.

8. In apparatus as described in claim 7, individual air jackets around each tubular combustion means and tubular jackets surrounding said transverse conduit means communicating with said individual air jackets.

9. Apparatus of the type set forth in claim 2, wherein telescopic joints are provided for said tubular combustion means to permit expansion thereof with respect to said casing.

10. In apparatus as described in claim 9, each telescopic joint comprising two sections, one partially received and slidable within the other, and an expansible sleeve connected to each section and sealing the joint therebetween.

11. In apparatus as described in claim 10, said tubular combustion means comprising an outer two-section conduit extending from the outlet of the impeller to the turbine wheel and forming an air jacket around the inner conduit, said inner and outer conduits being slidable lengthwise with respect to each other at their discharge ends to allow for expansion and contraction.

12. Apparatus of the type set forth in claim 2, wherein air jackets are provided surrounding said tubular combustion means opening into the latter and discharging into said conduit means for conducting air from said compression chamber through and around said tubular combustion means.

13. In apparatus as described in claim 12, equalizing conduits connecting the air jacket means of each tubular combustion means to those of adjacent tubular combustion means.

FRANK BERNARD HALFORD.

REFERENCES CITED

The following references are of record in the file of this patent:

UNITED STATES PATENTS

| Number | Name | Date |
|---|---|---|
| 635,919 | Curtis | Oct. 31, 1899 |
| 789,554 | Lemale | May 9, 1905 |
| 1,043,768 | Holzwarth | Nov. 5, 1912 |
| 1,268,095 | Coe | June 4, 1918 |
| 1,502,062 | Schmidt | July 22, 1924 |
| 1,889,262 | Pavlecka | Nov. 29, 1932 |
| 2,030,474 | Schmidt | Feb. 11, 1936 |
| 2,099,785 | Willgoos | Nov. 23, 1937 |
| 2,168,726 | Whittle | Aug. 8, 1939 |
| 2,227,666 | Noack | Jan. 7, 1941 |
| 2,326,072 | Seippel | Aug. 3, 1943 |
| 2,396,068 | Youngash | Mar. 5, 1946 |

FOREIGN PATENTS

| Number | Country | Date |
|---|---|---|
| 347,206 | Great Britain | Apr. 16, 1931 |
| 461,887 | Great Brtain | Feb. 25, 1937 |
| 346,713 | France | Dec. 8, 1904 |
| 636,026 | France | Jan. 6, 1928 |
| 644,829 | Germany | May 14, 1937 |

OTHER REFERENCES

Ser. No. 367,666, Anxionnaz et al. (A. P. C.), published May 25, 1943.

"Possibilities of Jet Propulsion," by G. Geoffrey Smith, in Flight, issue of Oct. 9, 1941, pages 239 and 242.